Oct. 31, 1967   OLE-BENDT RASMUSSEN   3,349,431
APPARATUS FOR COLD-STRETCHING ORIENTABLE SHEET MATERIAL
Original Filed June 8, 1962
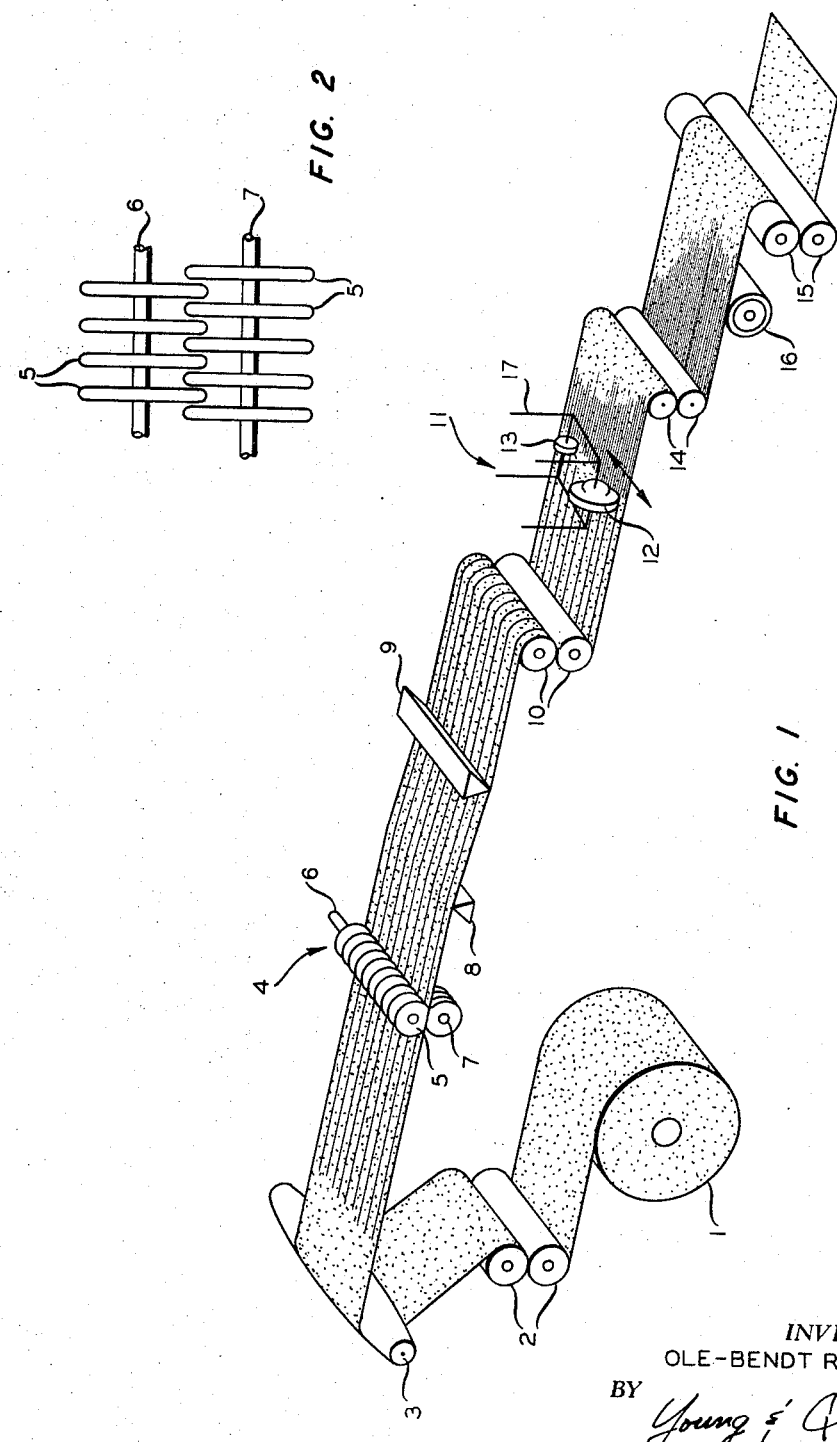
INVENTOR
OLE-BENDT RASMUSSEN
BY
*Young & Quigg*
ATTORNEYS

United States Patent Office 3,349,431
Patented Oct. 31, 1967

3,349,431
APPARATUS FOR COLD-STRETCHING ORIENTABLE SHEET MATERIAL
Ole-Bendt Rasmussen, Farum, Denmark, assignor to Phillips Petroleum Company, Bartlesville, Okla., a corporation of Delaware
Original application June 8, 1962, Ser. No. 201,205, now Patent No. 3,233,029, dated Feb. 1, 1966. Divided and this application Sept. 2, 1965, Ser. No. 484,558
Claims priority, application Denmark, June 9, 1961, 2,353/61
6 Claims. (Cl. 18—1)

ABSTRACT OF THE DISCLOSURE

An apparatus for cold-stretching orientable sheet material by folding the sheet into pleats and then stretching the pleated sheet between pairs of feed and take-up rolls. The stretching is carried out by means of a pair of take-up rolls, the peripheral speed of which is greater than the peripheral speed of the feed rolls. A wetted roll is preferably positioned within the stretching area to even out the friction on the film as the pleats disappear during the lateral contraction taking place during the longitudinal stretching.

---

This is a divisional application of my copending application Ser. No. 201,205, filed June 8, 1962, now Patent No. 3,233,029.

This invention relates to a method of cold-stretching a sheet material, which can be oriented, in which an even and uniform stretching is obtained over the whole width of the sheet or film without any risk of bursting and, accordingly, maximal stretching can be obtained in a single continuous stretching process.

It is known that in many plastic materials stretching produces orientation of the molecules in the direction of stretching, and that the physical character of the material may thus be changed, e.g. the tensile strength.

In particular, this is true for the linear polymers of high molecular weight, of which polyalkylenes and polyamides are typical representatives.

The stretching of a sheet occurs in a narrow zone across the direction of stretching (the necking-down zone), and as simultaneously a strong contraction in the width of the sheet takes place, it will be almost impossible to get the material uniformly stretched over its whole width and at the same time obtain a maximal stretching without rupturing the sheet.

It has been proposed to obviate these difficulties by spacing the pairs of rolls, between which the stretching zone is positioned, very far apart, for example at a distance of up to 70 times the width of the film, and to localize the stretching zone far beyond the middle of this distance, since it has been found that the sheet material will thus voluntarily form soft longitudinal folds between the supply rolls and the stretching zone, thus partly equalizing the variations in the direction of the tensile force, which results from the contraction in width. A total equalization cannot, however, be attained, and the apparatus is inordinately bulky.

The invention is based upon the idea that it is possible by a forced creation of said folds, partly to reduce the length of the apparatus to a reasonable size, and partly to control the folding, so that the latter takes place quite uniformly over the whole width of the sheet. The characteristic feature of the invention is, accordingly, that the material is introduced in the stretching zone in a pleated state, a lengthwise pleating by means of a pleating mechanism being imparted to the sheet over the whole width to such an extent that the width of the sheet is reduced by an amount substantially corresponding to the contraction in width resulting from the stretching. Thus, the tensile force is uniformly distributed upon each single fold, i.e. the folding is in fact equal to a subdivision of the film into a great many narrow bands, whereby the possibility of oblique tensile forces is correspondingly reduced.

It is known that in certain cases it is advantageous to carry out the stretching at as low a temperature as technically possible. For example, this applies to the production of multi-ply stretched and cross-laminated sheets, when a particularly high tear strength is desired. Hitherto, the possibilities of stretching wide sheets at exceedingly low temperatures have been strongly limited, owing to the necking-down zone becoming narrower, the lower the temperature is. By using the present method it has been found possible to stretch low-pressure polyethylene and isotactic polypropylene of the most high-crystalline qualities in the market at about 0° C. and in the ratio of 1:4.

In a preferred embodiment of the present method, the tensional stretching forces can be further equalized, according to the invention, by first carrying out a coarse pleating, which is then changed into a fine pleating by successively straightening the single pleats in the coarse pleating by a regional stress, which is shifted over the width of the sheet, and which on the seat of action presses the sheet material so far out of the sheet plane that the coarse pleats are straightened, the material then voluntarily pleating finely when the stress has passed on to the next pleat.

According to the invention, an equal stretching action even to the borders of the sheet can be attained by supplying the sheet to the pleating apparatus over a crown roll. Between this roll and the pleating apparatus, the distance between the borders of the sheet is reduced by an amount corresponding to the reduction in the width of the sheet produced by the stretching. By adjusting the degree of crown in the roll in relation to the distance between said roll and the pleating apparatus, it is made possible that the distance from a plane through the pleating mechanism perpendicular to the longitudinal direction of the sheet to any point of the generatrix along which the sheet leaves the crown roll, remains the same and that the stress upon the borders thus does not exceed that in the middle of the sheet.

According to the invention, the material can also be subjected to a strong cooling in the stretching zone. This is of importance in materials which generate a great amount of heat when stretched at low temperature.

FIGURE 1 of the drawing diagrammatically illustrates the process of the invention.

FIGURE 2 of the drawing illustrates one form of apparatus for pleating a sheet to be stretched.

Referring to FIGURE 1, the unstretched sheet is supplied from a supply roll 1 and passes over a pair of rolls 2, of which one or both are driven, thus ensuring an even and uniform supply of the sheet. From the pair of rolls 2, the sheet passes over a crown roll 3 to a pleating mechanism 4 consisting of two sets of discs 5, which are thus mounted spaced apart upon shafts 6 and 7 over and under the sheet, respectively, so that the discs in one set mesh between the discs in the other set, the distance between the shafts 6 and 7 being somewhat less than the diameter of the discs. This relationship is shown in more detail in FIGURE 2. The plane of each disc is parallel to the feed direction of the sheet, and one set of the discs is preferably driven at a peripheral speed slightly exceeding the speed of the sheet. Thus, the discs produce coarse longitudinal folds or convolutions in the sheet. The latter then passes over the rim of a cross-beam 8, the effect of which is to press the convolution into pleats, this action being aided by another cross-beam 9 acting upon the opposite surface of the pleated sheet.

The sheet, which is now coarsely pleated, can then be finely pleated. After passing over another pair of rolls 10, the sheet reaches an assembly mechanism 11 which produces the fine pleating. In the embodiment shown in the drawing, the important parts of this assembly are a large disc 12 with a rounded edge, which can be shifted across the film, and a smaller, almost ball-shaped disc 13 positioned to follow behind disc 12. Discs 12 and 13 are rotatably mounted on a carrier 17. A series of such assemblies may be attached to an endless chain carrying the assemblies across the film, so that one assembly contacts the film before the previous one leaves. However, it is also possible to use a single assembly reciprocating across the film, whereby the disc 13 is turned over to follow behind the disc 12 whenever the latter changes its direction, or a disc 13 may be placed on each side of the disc 12 and displaceable in a vertical direction in such a manner that only the one disc 13, which at a given time is behind the disc 12, is in contact with the sheet.

The disc 12 presses so strongly upon the sheet that the pleat, with which it is in contact, is straightened. When the disc 12 is shifted to the next pleat, the straightened material in the abandoned pleat, will again wrinkle, but now it will form a lot of fine pleats, which are then turned over and pressed down by the following disc 13.

The finely pleated sheet then passes into the part of the apparatus, where the stretching is to be carried out. This is accomplished over a pair of rolls 14, of which at least one is driven with substantially the same peripheral speed as the speed of the entering sheet, and which are pressed so strongly together that the sheet cannot slide. The stretching is carried out by means of a pair of rolls 15, the peripheral speed of which is as many times greater than that of the pair of rolls 14, as corresponds to the desired degree of stretching. To localize the stretching zone proper, a felt coated roll 16 is provided, which is adapted so that the felt can always be kept wet, for example by the roll being hollow with a perforated metal mantle beneath the felt coating, and liquid being supplied through the roll shaft.

The moistening serves to even out the friction as the pleats gradually disappear during the contraction taking place during the stretching. The displacements of material taking place as a result of the stretching should as far as possible take place equally easily all over the width of the stretching zone in order to reduce the risk of rupturing the film.

The moistening also serves to produce a rapid and uniform cooling of the necking-down zone. This is of importance, for example, when high-crystalline polyethylene or polypropylene is being stretched, because these high-crystalline substances on stretching generate a great amount of heat that has to be removed in order not to make the orientation irregular. However, the said heat is removed by roll 16, which may further be cooled below room temperature.

By adapting the pair of rolls 15 to be driven with changeable peripheral speed, the stretching can be adjusted so that the fine pleats in the sheet contain just sufficient material to be fully straightened out during the stretching so that the stretched sheet leaves the apparatus in a perfectly smooth state.

I claim:
1. Apparatus for cold stretching orientable sheet material comprising, in combination, means for forcing said sheet into multiple lengthwise folds across the width of said sheet, means for smoothing said folds into pleats, and means for subjecting the resulting pleated film to longitudinal stretching, and cooling means positioned between said smoothing means and said stretching means to even out friction on said pleated sheets as the pleats gradually disappear due to the longitudinal stretching.

2. Apparatus for cold stretching orientable plastic sheet material comprising, in combination, means for forming longitudinal pleats in said sheet, means for lengthwise stretching the pleated sheet, and a wettable felt covered drum positioned between said means and over which said sheet must pass while being stretched.

3. Apparatus for continuously cold stretching orientable plastic material comprising, in combination, means for supplying a relatively long and narrow sheet of said material and moving same lengthwise along a path, a first set of discs mounted spaced apart on a first center shaft, a second set of like discs mounted spaced apart on another shaft aligned parallel to said first shaft and spaced therefrom a distance somewhat less than the diameter of said discs so that said discs intermesh across the path of said sheet whereby said sheet is forced into longitudinal serpentine folds across its width on being passed between said sets of discs, means for smoothing said folds into pleats, and means for stretching the pleated sheet lengthwise, and cooling and moistening means positioned between said smoothing means and said stretching means over which said pleated sheets must pass while being stretched.

4. Apparatus for continuously cold stretching orientable plastic material comprising, in combination, means for supplying a relatively long and narrow sheet of said material and moving same lengthwise along a path, a first set of discs mounted spaced apart on a first center shaft, a second set of like discs mounted spaced apart on another shaft aligned parallel to said first shaft and spaced therefrom a distance somewhat less than the diameter of said discs so that said discs intermesh across the path of said sheet whereby said sheet is forced into longitudinal serpentine folds across its width on being passed between said sets of discs, two bars positioned across said path downstream in the direction of said sheet travel from said discs, one bar above and one below said sheet but both in contact therewith so as to smooth said folds into pleats, a first pair of pinch rolls positioned to receive the pleated sheet, a second pair of rolls at least one of which is driven positioned to receive sheet from said first pair of rolls and applying stretching force thereto, and a wettable felt covered drum positioned between said first and second pair of rolls in the path of said sheet.

5. Apparatus according to claim 4 including a third pair of rolls positioned in said path between said bars and said first pair of rolls and means to move across said sheet at a right angle to its direction of travel for pressing a portion of said sheet out of its normal plane a distance sufficient to remove a pleat temporarily.

6. Apparatus according to claim 4 including a crown roll positioned immediately upstream with respect to the direction of travel of said sheet from said sets of discs.

References Cited
UNITED STATES PATENTS

| 3,188,372 | 6/1965 | Roos | 18—19 X |
| 3,220,056 | 11/1965 | Walton | 18—19 |
| 3,220,057 | 11/1965 | Walton | 18—19 |
| 3,257,488 | 6/1966 | Rasmussen. | |

WILLIAM J. STEPHENSON, *Primary Examiner.*